US009606975B2

(12) United States Patent
Oh et al.

(10) Patent No.: US 9,606,975 B2
(45) Date of Patent: Mar. 28, 2017

(54) APPARATUS AND METHOD FOR AUTOMATICALLY GENERATING VISUAL ANNOTATION BASED ON VISUAL LANGUAGE

(71) Applicant: Electronics and Telecommunications Research Institute, Daejeon (KR)

(72) Inventors: Weon Geun Oh, Daejeon (KR); Sang Il Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 14/320,362

(22) Filed: Jun. 30, 2014

(65) Prior Publication Data

US 2015/0161094 A1 Jun. 11, 2015

(30) Foreign Application Priority Data

Dec. 10, 2013 (KR) ........................ 10-2013-0153299

(51) Int. Cl.
*G06F 17/00* (2006.01)
*G06F 17/24* (2006.01)
(Continued)

(52) U.S. Cl.
CPC ...... *G06F 17/241* (2013.01); *G06F 17/30256* (2013.01); *G06K 9/00664* (2013.01); *G06K 2209/27* (2013.01)

(58) Field of Classification Search
CPC ...... G06F 17/241; G06F 17/2247; G06K 9/46
(Continued)

(56) References Cited

U.S. PATENT DOCUMENTS

| 7,318,193 B2 | 1/2008 | Kim et al. | |
| 8,401,342 B2 * | 3/2013 | Ruzon | G06T 7/0028 |
| | | | 382/181 |

(Continued)

OTHER PUBLICATIONS

"Information technology—Coding of audio-visual objects—Part 11: Scene description and application engine", International Standard ISO/IEC 14496-11, Dec. 15, 2005, ISO copyright office, Switzerland.
(Continued)

*Primary Examiner* — Stephen Hong
*Assistant Examiner* — Matthew Ludwig

(57) ABSTRACT

Provided are an apparatus and method for automatically generating a visual annotation with respect to a massive image based on a visual language. The apparatus for automatically generating a visual annotation based on a visual language includes an image input unit configured to receive an input image, an image analyzing unit configured to extract feature information of the input image received by the image input unit, a searching unit configured to search a similar image with respect to the input Image and text information included in the similar image by using the feature information extracted by the image analyzing unit, and a visual annotation configuring unit configured to configure a visual annotation with respect to the input image by using the text information searched by the searching unit.

13 Claims, 5 Drawing Sheets

(51) Int. Cl.
*G06F 17/30* (2006.01)
*G06K 9/00* (2006.01)

(58) Field of Classification Search
USPC .......................................... 715/230, 231, 233
See application file for complete search history.

(56) References Cited

U.S. PATENT DOCUMENTS

2009/0313694 A1   12/2009  Mates
2010/0076921 A1*   3/2010  Kato .................... G06F 19/321
                                                                             706/52
2012/0269429 A1*  10/2012  Lee ..................... G06K 9/4652
                                                                             382/165
2013/0188886 A1*   7/2013  Petrou .................... G06F 3/048
                                                                             382/305

OTHER PUBLICATIONS

Weon-Geun Oh et al., "Visual Language-based Image Search Technology", Conference of Korean Institute of Information Scientists and Engineers (KIISE), Nov. 15, 2013, Electronics and Telecommunications Research Institute, Korea.

* cited by examiner

APPARATUS AND METHOD FOR AUTOMATICALLY GENERATING VISUAL ANNOTATION BASED ON VISUAL LANGUAGE

CROSS-REFERENCE TO RELATED APPLICATIONS

This application claims priority under 35 U.S.C. §119 to Korean Patent Application No. 10-2013-0153299, filed on Dec. 10, 2013, the disclosure of which is incorporated herein by reference in its entirety.

TECHNICAL FIELD

The present invention relates to an apparatus and method for automatically generating a visual annotation with respect to a massive image based on a visual language.

BACKGROUND

A report of an information technology (IT) market research institution showed that an amount of digital information in the world was approximately 1.8 zettabyte as of 2011, and the amount of digital information is anticipated to grow by more than 50 times to big data in 2020 (IDC & EMC 2011).

Big data refers to an aggregation of massive structured data (numbers, office DBs, and the like) or unstructured data (multimedia such as video, SNS, and the like) beyond capabilities of existing database management tools for collecting, storing, managing, and analyzing data.

Namely, big data is too big in generation amount, period, format, and the like, to be collected, stored, searched, and analyzed through related art methods, relative to existing data, and in terms of "volume" (massiveness), "variety" (various forms), and "velocity" (fast speed), big data is known as 3V, and may also be defined as 4V with "value" as a fourth feature in addition thereto.

The reason why the value of big data has emerged as an importance feature is because most big data, as well as having a massive size, is composed of amorphous text, image, and the like, and such data propagates very fast over time, making it difficult to recognize the entirety thereof and discover a certain pattern thereof, which leads to stressing importance of value creation.

Processing of unstructured data may be divided into natural language processing based on text or language and processing of visual language as a semantic conveyance system through images such as video, photograph, TV, or movie.

Among these, a visual language-based image analysis and search technology has come to prominence as a technology to collectively extract and analyze image information and create new knowledge and information and obtain huge social and economical gains by utilizing infinite information included in images.

A visual language, a semantic conveyance system based on images such as video, photograph, TV, movie, and the like, is different from a natural language based on a language (text of voice)

A natural language conceptually conveys meaning, while a visual language conveys meaning specifically and directly, and a natural language describes objects abstractly and ideationally, while a visual language specifically describes objects, eliminating ambiguousness in meaning.

Also, a visual language transcending the bound of nationality of a language, and in order to configure a visual language from an image, information needs to be extracted from a provided image and analyzed.

In order to promptly and accurately search image data among big data, the necessity of a technique of recognizing images and objects and scenes within images and automatically providing metadata corresponding to contents expressed by images, namely, the necessity of configuring a visual annotation, has been increased.

SUMMARY

Accordingly, the present invention provides an apparatus and method for automatically generating a visual annotation based on a visual language capable of effectively searching a massive image by automatically adding an annotation to image content based on a visual language systematizing meaning and contents of images, and accurately searching image content such as video, photograph, a TV image, or movie even in an open environment such as smart mobile or cloud computing at a high speed.

In one general aspect, an apparatus for automatically generating a visual annotation based on a visual language may include: an image input unit configured to receive an input image; an image analyzing unit configured to extract feature information of the input image received by the image input unit; a searching unit configured to search a similar image with respect to the input Image and text information included in the similar image by using the feature information extracted by the image analyzing unit; and a visual annotation configuring unit configured to configure a visual annotation with respect to the input image by using the text information searched by the searching unit.

In another general aspect, a method for automatically generating a visual annotation based on a visual language may include: receiving an input image; extracting feature information of the input image; searching an image similar to the input image by using the extracted feature information and searching text information included in the similar image; analyzing the feature information of the input image and the text information included in the similar image to select text information with respect to the input image; and configuring a keyword list by using the selected text information and a visual annotation with respect to the input image by using the keyword list.

In another general aspect, a system for automatically generating a visual annotation based on a visual language may include: a terminal configured to receive an input image and transmitting the input image and a visual annotation request signal with respect to the input image; and a server configured to receive the input image and the visual annotation request signal with respect to the input image from the terminal, extract feature information of the input image, and search an image and metadata DB according to the feature information of the input image to configure a visual annotation with respect to the input image.

Other features and aspects will be apparent from the following detailed description, the drawings, and the claims.

In the case of the apparatus and method for automatically generating a visual annotation based on a visual language according to embodiments of the present invention, a visual annotation with respect to an input image is automatically configured by using an image and metadata DB, image-related knowledge information accounting for 80% or more of big data may be effectively searched.

Also, according to embodiments of the present invention, a visual annotation with respect to an image may be automatically configured based on a visual language, and thus, the embodiments of the present invention may be extensively applied to image search, management, distribution, and service fields, and mobile augmented reality (AR) and circumstance monitoring and forewarning fields emerging as next-generation industry.

In addition, according to embodiments of the present invention, an effect of combining a digital platform for spreading massive, quality digital images and content to a currently established wired/wireless network environment may be obtained.

The effects of the present invention are not limited to the aforesaid, but other effects not described herein will be clearly understood by those skilled in the art from descriptions below.

DETAILED DESCRIPTION OF EMBODIMENTS

Hereinafter, embodiments of the present invention will be described in detail with reference to the accompanying drawings.

Figure 1:
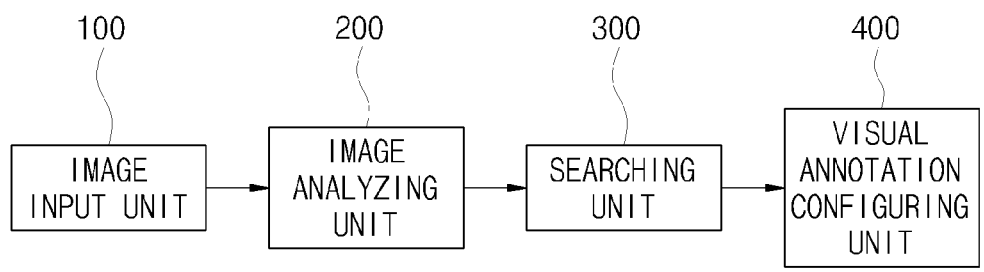
FIG. 1 is a block diagram illustrating an apparatus for automatically generating a visual annotation based on a visual language according to an embodiment of the present invention.
Figure 4:
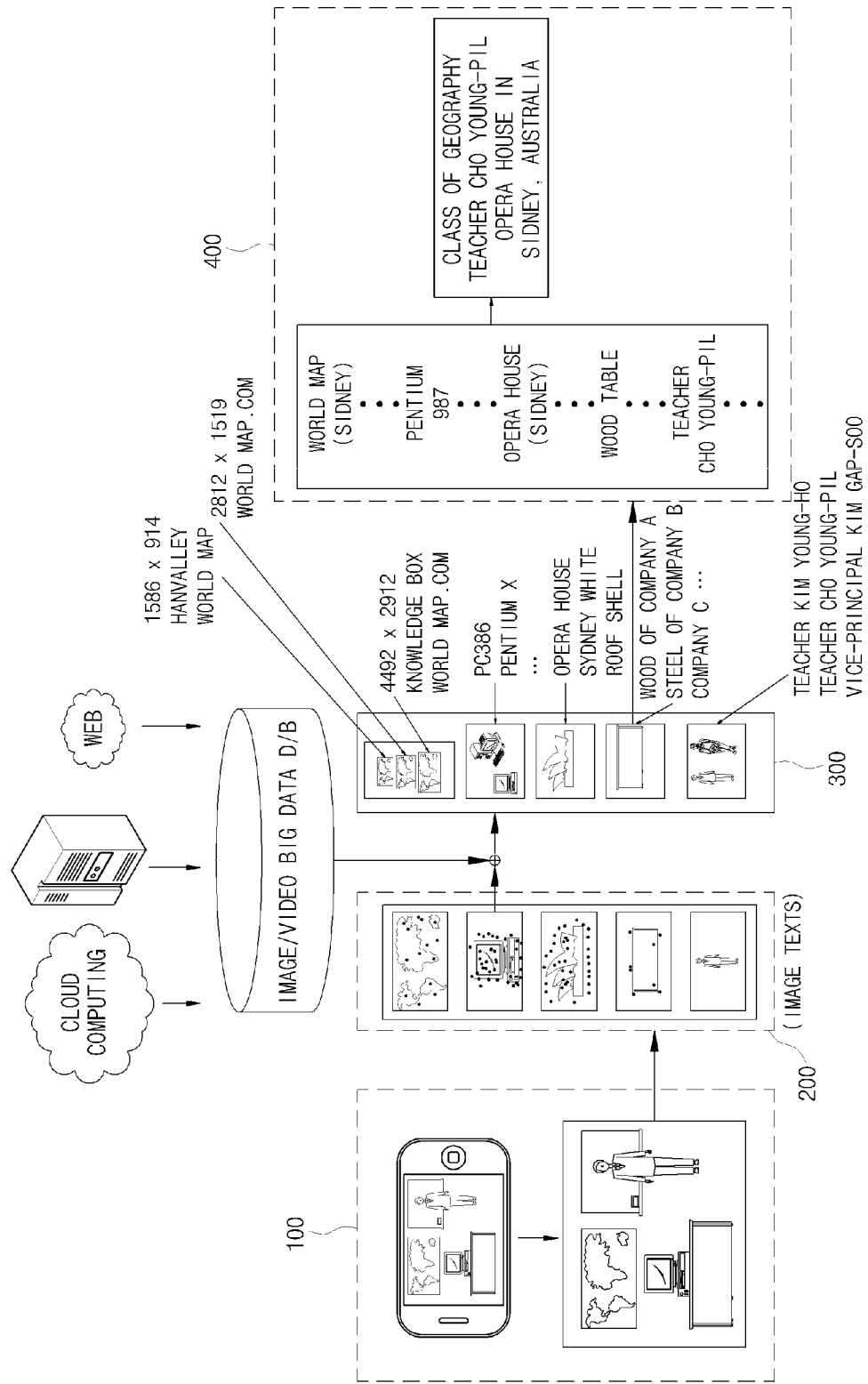
FIG. 4 is a conceptual view illustrating a process of automatically generating visual annotations based on a visual language according to an embodiment of the present invention.

FIG. 1 is a block diagram illustrating an apparatus for automatically generating a visual annotation based on a visual language according to an embodiment of the present invention, and FIG. 4 is a conceptual view illustrating a process of automatically generating visual annotations based on a visual language according to an embodiment of the present invention.

Referring to FIGS. 1 and 4, an apparatus for automatically generating a visual annotation based on a visual language according to an embodiment of the present invention includes an image input unit 100 receiving an input image, an image analyzing unit 200 extracting feature information of the received input image, a searching unit 300 searching a similar image with respect to the input image and text information included in the similar image, and a visual annotation configuring unit 400 configuring a visual annotation with respect to the input image using the text information searched by the searing unit 300.

Here, the input image received by the image input unit 100 is pure video or image without any metadata or information.

Also, the image analyzing unit 200 according to an embodiment of the present invention analyzes the input image received by the image input unit 100 and extracts at least one of a color, a texture, a name, a shape, a position of an object included in the input image, and an interrelation between a plurality of objects included in the input image, as feature information of the input image.

Also, the searching unit 300 according to an embodiment of the present invention searches a similar image with respect to the input image and text information included in the similar image by using the feature information extracted by the image analyzing unit 200. In this case, by using an image and metadata DB including images collected from a cloud environment, a Web, or a server and feature information and text information of the images, the searching unit 300 receives the feature information of the image included in the image and metadata DB and compares the feature information of the input image with the feature information included in the image and metadata DB to select a similar image.

Namely, the gist of the apparatus for automatically generating a visual annotation based on a visual language according to an embodiment of the present invention is combining text information describing an image similar to the input image by using image and metadata included in a previously obtained DB, and generating a visual annotation with respect to the input image through semantic analysis, and the searching unit 300 according to an embodiment of the present invention compares the feature information of the input image with the feature information of a candidate image included in the image and metadata DB to select a similar image.

In this case, the searching unit 300 according to an embodiment of the present invention calculates similarity between the feature information of the image included in the image and metadata DB and the feature information of the input image, and when the calculated similarity is equal to or greater than a pre-set value, the searching unit 300 selects the image included in the image and metadata DB as a similar image with respect to the input image.

Namely, when searching an image similar to the input image received by the image input unit 100 using the image and metadata DB, the searching unit 300 according to an embodiment of the present invention calculates similarity between the input image and the image included in the image and metadata DB by comparing the feature information, and when the calculated similarity is equal to or greater than the pre-set value (for example, when it is determined that 50% or more of factors constituting the feature information are similar), the searching unit 300 selects the corresponding image included in the image and metadata DB as a similar image, and during the similar image selecting process, the searching unit 300 searches metadata (text information) included in the image within the image and metadata DB together.

Also, the searching unit 300 according to an embodiment of the present invention sets a candidate group using text information included in the similar image, and selects text information having frequency equal to higher than pre-set frequency among text information included in the candidate group, as text information with respect to the input image.

Namely, the searching unit 300 selects the similar image by comparing the feature information of the image within the image and metadata DB and the feature information of the input image, sets text information candidate group with respect to the input image as an aggregation of text information included in the selected similar image, and selects text information having frequency equal to or greater than the pre-set frequency (for example, text information searched three or more times) among a plurality of text information included in the candidate group, as text information with respect to the input image received by the image input unit 100.

Also, the visual annotation configuring unit 400 according to an embodiment of the present invention configures a keyword list by analyzing the text information with respect to the input image selected by the searching unit 300, and processes text information included in the keyword list to generate a visual annotation expressing contents included in the input image as a sentence.

In this case, the visual annotation configuring unit 400 may generates a visual annotation with respect to the input image by semantically analyzing the text information in the keyword list corresponding to an object included in the input image, rather than simply describing the object included in the input image.

Figure 2:
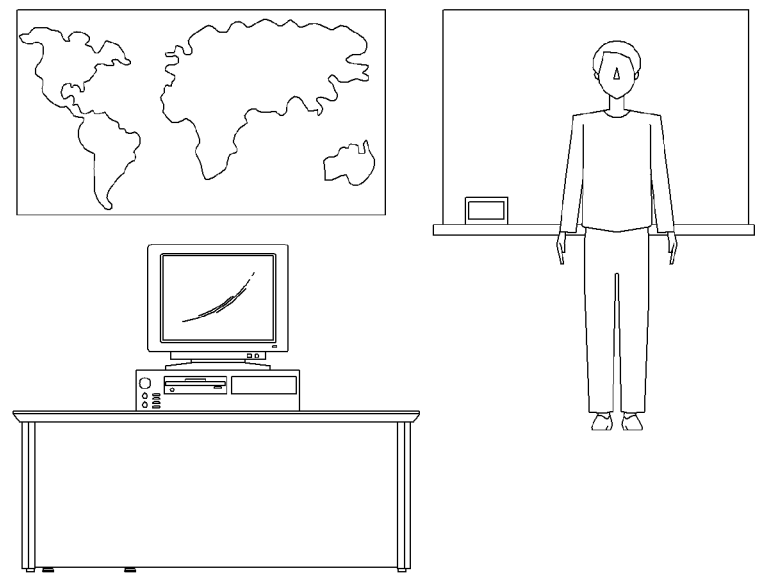
FIG. 2 is a conceptual view illustrating a simple image including basic information.
Figure 3:
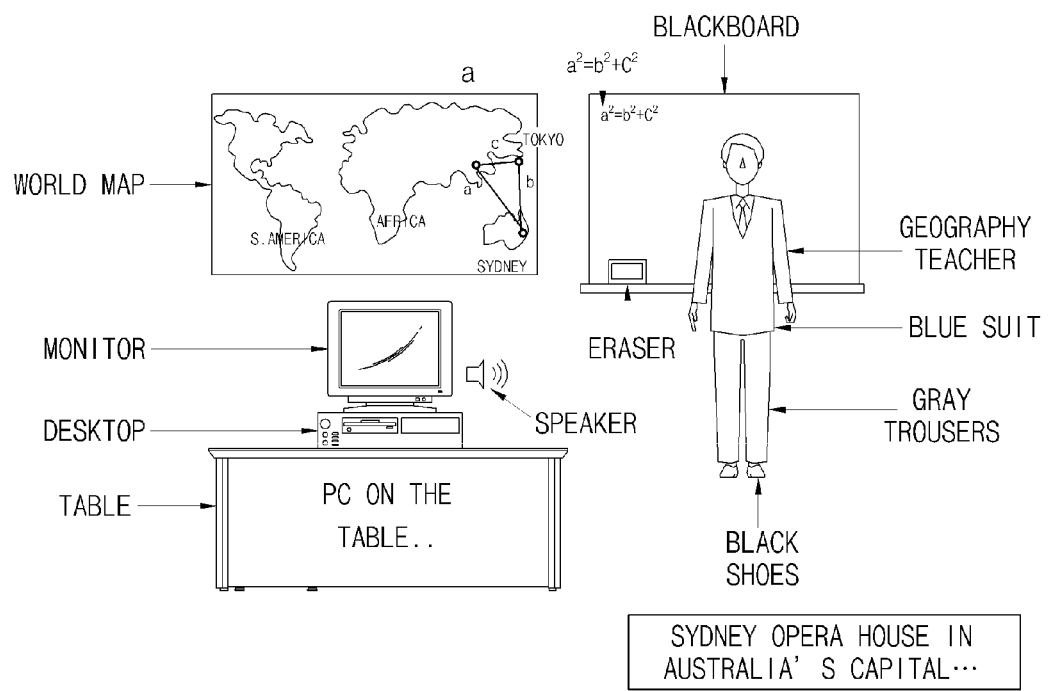
FIG. 3 is a conceptual view illustrating a visual language including visual annotations according to an embodiment of the present invention.

Referring to FIG. 3, discriminated from a simple image including only basic information (name, size, resolution, and the like) of FIG. 2, the image including a visual annotation generated according to application of the present invention may include specific information of the image, namely, names of objects (for example, a world map, a blackboard, a geography teacher, an eraser, a blue suit, gray trousers, black shoes, a monitor, a desktop, a speaker, and a table), positions and an interrelation between objects (for example, PC on the table), visual annotations by semantically analyzing the input image (a distance from Seoul to Sidney, Opera house on a monitor screen, a location of Sidney on a world map, and a class subject of a teacher, and the like), and generates visual annotations (for example, Opera house in Sidney, Australia, class of CHO YOUNG-PIL, geography teacher) expressing contents of the image as sentences.

In this case, the visual annotation configuring unit 400 may configure the visual annotations expressing contents included in the image in a multinational language by using the similar image selected by the searching unit and the text information included in the similar image.

Namely, the visual annotation configuring unit 400 generates a visual annotation with respect to a combination of a plurality of objects included in the input image or any one of the plurality of objects by using the keyword list.

Figure 5:
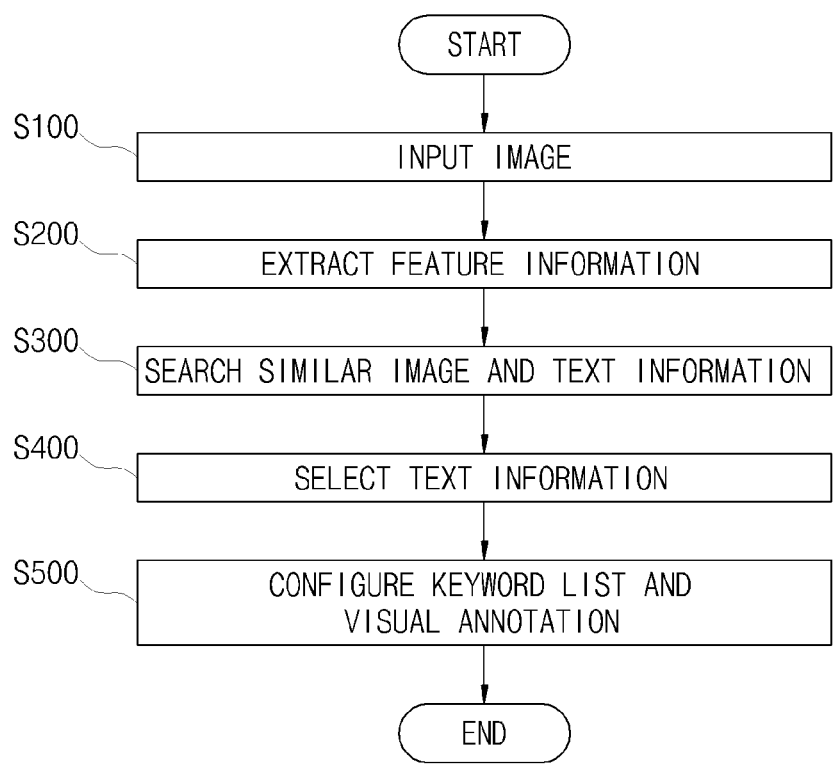
FIG. 5 is a flow chart illustrating a method for automatically generating a visual annotation based on a visual language according to an embodiment of the present invention.

FIG. 5 is a flow chart illustrating a method for automatically generating a visual annotation based on a visual language according to an embodiment of the present invention.

Referring to FIG. 5, the method for automatically generating a visual annotation based on a visual language according to an embodiment of the present invention includes image input operation S100 of receiving an input image, feature information extracting operation S200 of extracting feature information of the input image received in image input operation S100, similar image and text information searching operation S300 of searching an image similar to the input image by using the extracted feature information and searching text information included in the similar image, text information selecting operation S400 of analyzing feature information of the input image and text information included in the similar image and selecting text information with respect to the input image, and a keyword list and visual annotation configuring operation S500 of configuring a keyword list by using the selected text information and configuring a visual annotation with respect to the input image using the keyword list.

Here, in feature information extracting operation S200, the input image is analyzed to extract feature information including at least one of a color, a texture, a name, a shape, a position of an object included in the input image, and an interrelation between objects.

Also, in the similar image and text information searching operation S300, feature information extracted from images within an image and metadata DB including images collected from a cloud environment, a Web, or a server and feature information and text (metadata) of the images and the feature information of the input image received in image input operation S100 are compared to calculate similarity, and an image having high similarity is selected as a similar image of the input image.

Also, in text information selecting operation S400, a candidate group is set as a candidate for configuring a visual annotation with respect to the input image received in image input operation S100 by using text information included in the image selected as a similar image from among images included in the image and metadata DB, and select information with respect to at least one text information of the candidate group is received and selected as text information with respect to the input image, or text information having frequency equal to or higher than pre-set frequency among text information constituting the candidate group is selected as text information with respect to the input image.

Namely, feature information of images within the image and metadata DB and the feature information of the input image are compared to select an image similar to the input image from among the images within the image and metadata DB, and text information having high search frequency among the text information included in the similar image is selected as text information with respect to the input image.

Also, in keyword list and visual annotation configuring operation S500, a keyword list is generated by using the text information with respect to the input image selected in text information selecting operation S400, and a visual annotation is generated with respect to a combination of a plurality of objects included in the input image or at least one of the plurality of objects by using the keyword list.

In this case, in keyword list and visual annotation configuring operation S500, a sentence expressing contents included in the input image, as well as a description of an object included in the input image, is generated as a visual annotation with respect to the input image by applying a semantic analysis to the text information included in the keyword list.

A system for automatically generating a visual annotation based on a visual language according to another embodiment of the present invention includes a terminal configured to receive an input image and transmitting the input image and a visual annotation request signal with respect to the input image, and a server configured to receive the input image and the visual annotation request signal with respect to the input image from the terminal, extracting feature information of the input image, and searching an image and metadata DB according to the feature information of the input image to configure a visual annotation with respect to the input image.

In this case, the sever analyzes the input image received from the terminal and extracts at least one of a color, a texture, a name, a shape, a position of an object included in the input image, and an interrelation between a plurality of objects, as feature information of the input image.

Also, the server searches the image and metadata DB including images previously collected from cloud computing, a Web, or a different server, and feature information and text with respect to the images, to select a similar image with respect to the input image.

Namely, the server compares the feature information (e.g., a color, a texture, a name, a shape, a position of an object included in the input image, and an interrelation between a plurality of objects) extracted from the input image and feature information (e.g., a color, a texture, a name, a shape, a position of an object included in the input image, and an interrelation between a plurality of objects) extracted from images included in the image and metadata DB to calculate similarity, and selects an image having high similarity as a similar image of the input image.

In this case, the server selects a candidate group by using text information included in the similar image, and selects text information having frequency equal to or higher than pre-set frequency in the candidate group, as text information with respect to the input image.

Thus, in case in which text information included in the image similar to the input image is plural, text information having highest search frequency among the plurality of text information is selected as text information with respect to the input image, whereby an additional effect of promoting accurate searching in case of searching image content using a visual annotation may be obtained.

Also, the server receives select information with respect to at least any one text information in the candidate group, and selects text information with respect to the input image according to the select information.

Namely, in the system for automatically generating a visual annotation based on a visual language according to an embodiment of the present invention, an aggregation of text information included in images within the image and metadata DB selected as the image similar to the input image is set as a candidate group for configuring a visual annotation with respect to the input image, and a visual annotation may be configured by using text information having frequency equal to or greater than pre-set frequency among text information included in the candidate group or a visual annotation may be configured by using text information selected upon receiving select information through a user input with respect to the text information included in the candidate group.

Figure 6:
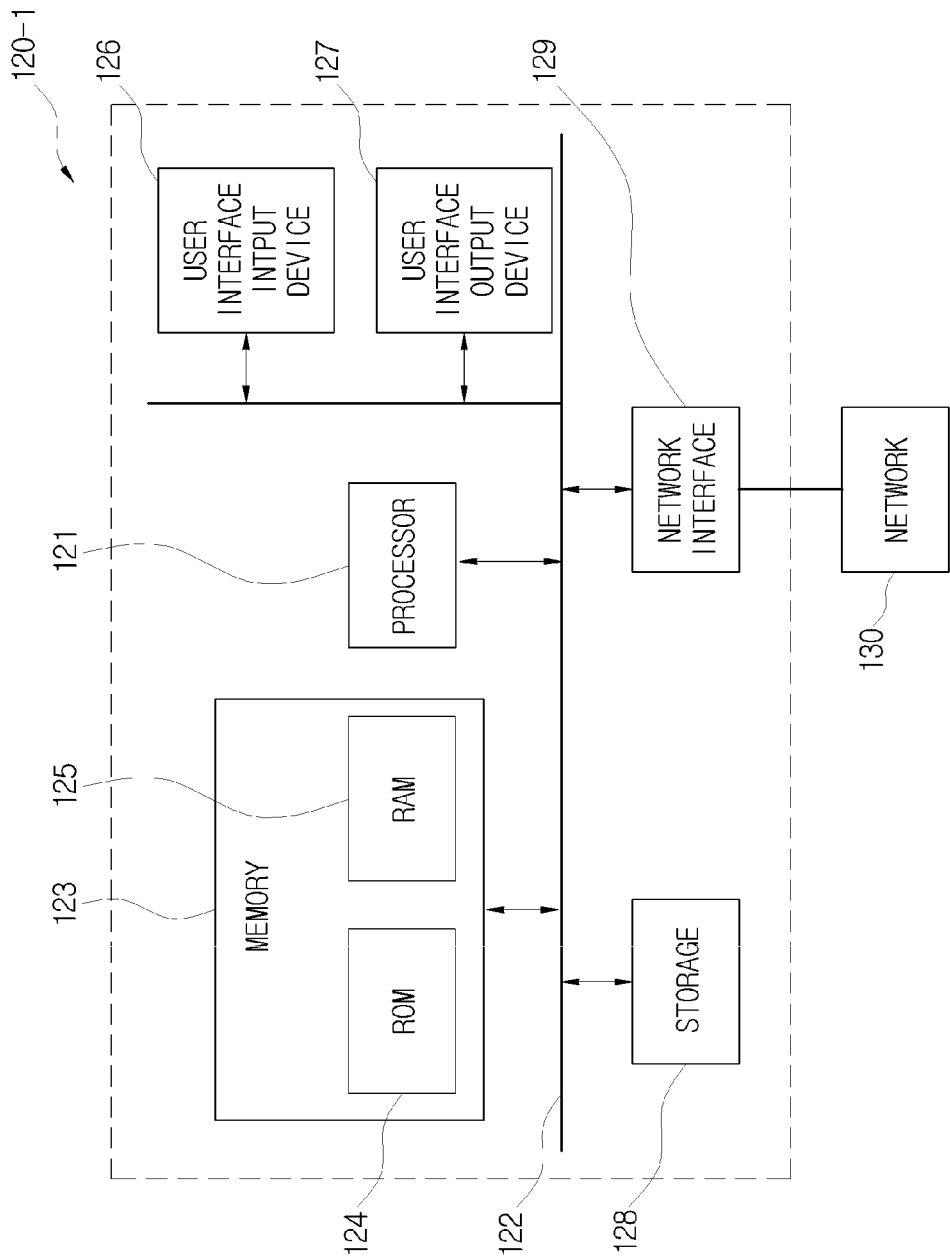
FIG. 6 is a view illustrating a configuration of a computer device in which a method for automatically generating a visual annotation based on a visual language according to an embodiment of the present invention is executed.

A method for automatically generating a visual annotation based on a visual language according to an embodiment of the present invention may be implemented in a computer system, e.g., as a computer readable medium. As shown in FIG. 6, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, a method for automatically generating a visual annotation based on a visual language according to an embodiment of the present invention may be implemented as a computer implemented method or as a non-transitory computer readable medium with computer executable instructions stored thereon. In an embodiment, when executed by the processor, the computer readable instructions may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus including a memory and computer processor for automatically generating a visual annotation based on a visual language, the apparatus comprising:
   image input instructions configured to, using the processor, receive an input image;
   image analyzing instructions configured to extract feature information of the input image received by the image input instructions;
   searching instructions configured to, using a processor, receive feature information of images included in an image and metadata database (DB), compare the feature information of the input image with the feature information of the images included in the image and metadata DB to select a similar image with respect to the input image, set a candidate group by using text information of the similar image, and select text information having frequency equal to or higher than pre-set frequency among a plurality of text information included in the candidate group, as text information for the input image; and
   visual annotation instructions configured to, using a processor, generate a keyword list by analyzing the text information for the input image selected by the searching instructions, and generate the visual annotation as at least one sentence expressing contents included in the input image with respect to at least one of a plurality of objects included in the input image by semantically analyzing the text information in the keyword list.

2. The apparatus of claim 1, wherein the image analyzing instructions analyze the input image to extract at least one of a color, a name, a shape, and a position of an object included in the input image, and an interrelation between objects, as the feature information of the input image.

3. The apparatus of claim 1, wherein the searching instructions calculate similarity between the feature information of the input image and the feature information of the images included in the image and meat data DB, and selects an image, included in the image and metadata DB, having calculated similarity equal to or greater than a pre-set value, as the similar image with respect to the input image.

4. A method for automatically generating a visual annotation based on a visual language, the method comprising:
   receiving an input image;
   extracting feature information of the input image;
   receiving feature information of images included in an image and metadata database (DB); and
   comparing the feature information of the input image with the feature information of the images included in the image and metadata DB to select a similar image with respect to the input image;

analyzing the feature information of the input image and text information of the similar image to select text information for the input image; and generating a keyword list by using the selected text information and configuring the visual annotation as at least one sentence expressing contents included in the input image with respect to the input image by semantically analyzing the text information in the keyword list, wherein the analyzing comprises:
setting a candidate group by using the text information of the similar image; and
selecting text information having frequency equal to or higher than pre-set frequency among a plurality of text information included in the candidate group, as the text information for the input image.

5. The method of claim 4, wherein the extracting feature information of the input image comprises analyzing the input image to extract at least one of a color, a name, a shape, and a position of an object included in the input image, and an interrelation between objects, as the feature information of the input image.

6. The method of claim 4, wherein the comparing comprises calculating similarity between the feature information of the input image and the feature information of the images included in the image and metadata DB, and selecting an image having high calculated similarity as the similar image of the input image.

7. The method of claim 4, wherein the analyzing the feature information of the input image and the text information further comprises selecting the text information of the input image by receiving selection information with respect to at least one text information of the candidate group.

8. The method of claim 7, wherein the generating a keyword list by using the selected text information comprises generating the keyword list by using the text information of the input image, and
wherein the configuring the visual annotation comprises configuring the visual annotation with respect to at least one of a plurality of objects included in the input image by using the keyword list.

9. A system for automatically generating a visual annotation based on a visual language, the system comprising:
a terminal configured to receive an input image and transmit the input image and a visual annotation request signal with respect to the input image; and
a server including a processor,
wherein the processor is configured to:
receive the input image and the visual annotation request signal with respect to the input image from the terminal,
extract feature information of the input image, search images stored in an image and metadata database (DB) using the feature information of the input image,
compare the feature information of the input image with feature information of the images stored in the image and metadata DB to select a similar image with respect to the input image,
set a candidate group by using text information of the similar image, select text information having frequency equal to or greater than pre-set frequency among a plurality of text information in the candidate group, as text information for the input image,
generate a keyword list by analyzing the text information of the input image, and
configure the visual annotation as at least one sentence expressing contents included in the input image with respect to at least one of a plurality of objects included in the input image by semantically analyzing the text information in the keyword list.

10. The system of claim 9, wherein the processor analyzes the input image received from the terminal to extract any one of a color, a name, a shape, and a position of an object included in the input image, and an interrelation between objects, as the feature information of the input image.

11. The system of claim 9, wherein the processor searches images previously collected from cloud computing, a Web, or a different server, and the image and metadata DB including feature information and text with respect to the images to select the similar image with respect to the input image.

12. The system of claim 11, wherein the processor calculates similarity between the feature information of the input image and the feature information of the images stored in the image and metadata DB, and selects an image having high similarity as the similar image.

13. The system of claim 9, wherein the processor receives selection information with respect to at least one text information in the candidate group, and selects the text information for the input image according to the selection information.

* * * * *